US011555777B2

(12) United States Patent
Alanazi et al.

(10) Patent No.: US 11,555,777 B2
(45) Date of Patent: Jan. 17, 2023

(54) METHOD AND SYSTEM FOR CORROSION SIMULATION AND ASSESSMENT

(71) Applicant: Saudi Arabian Oil Company, Dhahran (SA)

(72) Inventors: Nayef M. Alanazi, Dhahran (SA); Abdullatif I. Abdulhadi, Dhahran (SA); Talal Y. Alzahrani, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 745 days.

(21) Appl. No.: 16/511,466

(22) Filed: Jul. 15, 2019

(65) Prior Publication Data
US 2021/0018425 A1    Jan. 21, 2021

(51) Int. Cl.
*G01N 17/00* (2006.01)
*G01N 17/04* (2006.01)

(52) U.S. Cl.
CPC ......... *G01N 17/006* (2013.01); *G01N 17/043* (2013.01)

(58) Field of Classification Search
CPC .. G01N 27/4062; G01N 27/407; F01D 17/12; F01D 3/04; F02D 41/1483; F02D 41/1461; F02D 41/1474; F02D 41/146; F02D 41/1455; F02D 41/14951; F02D 41/1496; F02D 41/1494; F02D 41/1444; F02D 41/30
See application file for complete search history.

(56) References Cited

U.S. PATENT DOCUMENTS

| | | | |
|---|---|---|---|
| 5,888,374 A | 3/1999 | Pope et al. | |
| 6,077,418 A * | 6/2000 | Iseri | G01N 17/043 73/86 |
| 6,611,151 B1 | 8/2003 | Ruedisueli et al. | |
| 7,239,156 B1 | 7/2007 | Hladky et al. | |
| 2005/0274628 A1 | 12/2005 | Yang | |
| 2012/0074969 A1* | 3/2012 | Snelling | G01N 17/046 422/53 |

(Continued)

FOREIGN PATENT DOCUMENTS

| CN | 108169117 A | 6/2018 |
|---|---|---|
| EP | 0987536 A1 | 3/2000 |

(Continued)

OTHER PUBLICATIONS

Ilhan-Sungur et al., Corrosion Science, 2010, 161-171 (Year: 2010).*

(Continued)

*Primary Examiner* — Gurpreet Kaur
(74) *Attorney, Agent, or Firm* — Leason Ellis LLP

(57) ABSTRACT

A system, an apparatus and a method for simulating and assessing a damaged corrosion film in a pipe segment for pitting corrosion potential under field conditions, including variations in cathode to anode ratios. The apparatus has an anode case that holds a working electrode, a first body portion attachable to one end of the pipe segment, and a second body portion attachable to another end of the pipe segment, the first and second body portions defining a corrosion simulation cell. The anode case can be contained within the corrosion simulation cell, and the working electrode can include a test matrix.

9 Claims, 8 Drawing Sheets

(56) References Cited

U.S. PATENT DOCUMENTS

2016/0139030 A1    5/2016  Jovancicevic et al.

FOREIGN PATENT DOCUMENTS

| JP | H10227730 | 8/1998 |
| WO | 2014/112511 | 7/2014 |

OTHER PUBLICATIONS

English Machine Translation of CN108169117 (Year: 2018).*
International Search Report and Written Opinion in Corresponding PCT Application No. PCT/US2020/042079 dated Oct. 26, 2020. 11 pages.
Marc Singer, Ph.D. dissertation, titled "Study and Modeling of the Localized Nature of Top of he Line Corrosion," presented to The Russ College of Eng'g and Tech. of Ohio University, Aug. 2013.

* cited by examiner

METHOD AND SYSTEM FOR CORROSION SIMULATION AND ASSESSMENT

TECHNOLOGICAL FIELD OF THE DISCLOSURE

The present disclosure relates to a system, method and apparatus for simulating and assessing corrosion initiation under field conditions.

BACKGROUND OF THE DISCLOSURE

Corrosion of metal is a serious problem in many industries, including, among others, construction, manufacturing, petroleum and transportation. In the petroleum industry, for instance, corrosion tends to be particularly pervasive and problematic since the industry depends heavily on carbon steel alloys for its metal structures such as pipelines, supplies, equipment, and machinery. The problem of corrosion in such industries can be extremely challenging and costly to assess and remediate due to the harsh and corrosive environments within which the metal structures must exist and operate. Age and the presence of corrosive materials, such as, for example, oxygen ($O_2$), water ($H_2O$), hydrogen sulfide ($H_2S$), carbon-dioxide ($CO_2$), sulfates, carbonates, sodium chloride, potassium chloride, and microbes in oil and gas production can exacerbate the problem.

There exists an urgent unmet need for a technological solution that can simulate and assess corrosion initiation under field conditions.

SUMMARY OF THE DISCLOSURE

According to a non-limiting embodiment of the disclosure, an apparatus is provided that is suitable for simulating and assessing a damaged corrosion film in a pipe segment for pitting corrosion potential under field conditions, including variations in cathode to anode ratios. The apparatus has an anode case that holds a working electrode, a first body portion attachable to one end of the pipe segment, and a second body portion attachable to another end of the pipe segment, the first and second body portions defining a corrosion simulation cell. The anode case can be contained within the corrosion simulation cell. The working electrode can include a test matrix.

The apparatus can further include a reference electrode.

The test matrix can include an anode coupon. The anode coupon can include a head portion and a stem portion.

The pipe segment can include an inner exposure-control surface area and a cathode surface area.

The apparatus can include a fastener member configured to secure the pipe segment between the first body portion and second body portion.

The anode case can include a case cover and a case base.

The apparatus can include a case cover driver attached to the case cover and adapted to move the case cover with respect to the case base.

The first body portion can include an inlet conduit that supplies a simulation solution to the corrosion simulation cell.

The case cover can include an inner wall having an inner thread.

The case base can include an outer wall having an outer thread that engages said inner thread to attach the case cover to the case base.

The pipe segment can include a cathode surface area and the simulation solution forms the corrosion film on the cathode surface area.

The apparatus can include a processor. The processor can include at least one of a potentiostat, a galvanostat, or a zero-resistance ammeter (ZRA).

According to a non-limiting embodiment of the disclosure, a method is provided for simulating and assessing a damaged corrosion film in a pipe segment for pitting corrosion potential under field conditions, including variations in cathode to anode ratios. The method includes positioning the pipe segment between a first body portion and a second body portion, positioning an anode case in the pipe segment between the first body portion and second body portion, attaching the first body portion to the second body portion to form a simulation cell with the pipe segment, including the anode case, and supplying a simulation solution to the simulation cell to pre-expose a cathode area in the pipe segment.

The method can include opening the anode case to expose a working electrode to the simulation solution. Opening the anode case can include unscrewing a case cover from a case base to allow the simulation solution to contact the working electrode.

The method can include applying a non-conductive protective film to an exposure-control area in the pipe segment. The exposure-control area can control a cathode to anode ratio. The exposure-control area can define the cathode area in the pipe segment.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
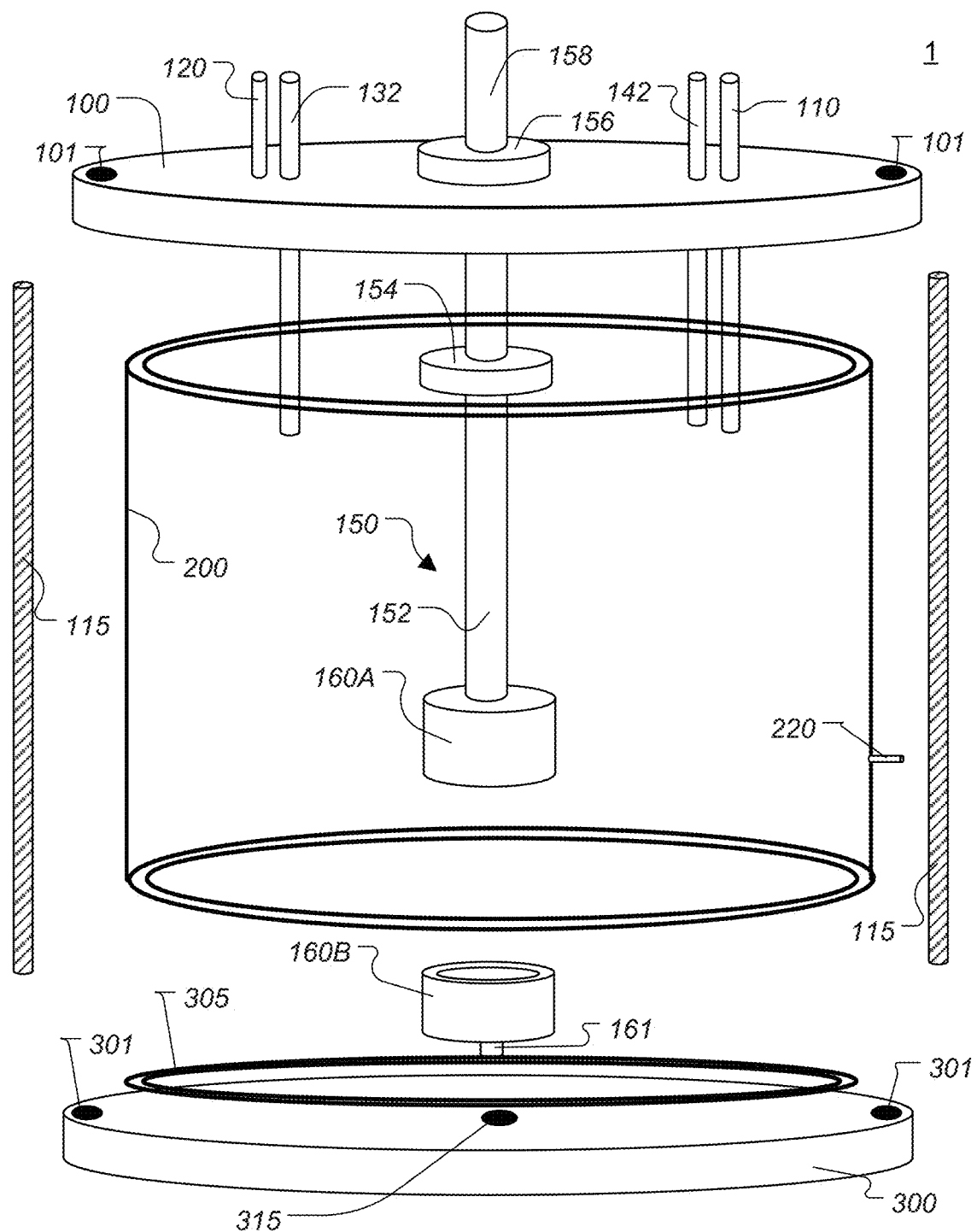
FIG. 1 shows a partially exploded view of an embodiment of a corrosion simulation (CS) apparatus that is constructed according to the principles of the disclosure.

The present disclosure is further described in the detailed description that follows.

DETAILED DESCRIPTION OF THE DISCLOSURE

The disclosure and its various features and advantageous details are explained more fully with reference to non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples or embodiments should not be construed as limiting the scope of the disclosure. Moreover, it is noted that like reference numerals represent similar parts throughout the several views of the drawings.

There are many types and causes of corrosion. Corrosion can occur, for example, as uniform corrosion or pitting corrosion. Causes can include, for example, $O_2$ corrosion, $CO_2$ corrosion (e.g., $CO_2+H_2O+Fe \rightarrow FeCO_3+H_2$), $H_2S$ corrosion (e.g., $H_2S+Fe+H_2O \rightarrow FeS_x+2H+H_2O$, where x is a positive integer), or microbe corrosion, which results from bacteria waste products like $CO_2$, $H_2S$, or organic acids.

Corrosion can be remediated by application or spontaneous formation of one or more layers of a protective film coating on metal surfaces that come into contact with corrosive agents. The protective film can include a passive film such as a film that is spontaneously formed on a surface of a metal structure by corrosion of the outermost surface layer of the structure, which then acts as a barrier to further oxidation. Alternatively, the protective film can include a material or compound such as, for example, polyethylene (PE), polypropylene (PE), epoxy, fusion-bonded epoxy (FBE), coal tar enamel, asphalt enamel, polyurethane, ceramic, corrosion-resistant alloys or metals, or other materials that can provide a proactive barrier between the metal structure and the harsh environment within which it must exist or operate. While effective at providing anticorrosion protection for metal structures, protective film coatings are not a panacea for corrosion.

The corrosion of metal structures coated with protective films is a common problem in industries such as oil and gas production and transport. Over time, metal structures coated with protective films can experience pitting corrosion, or pitting corrosion due to under deposit corrosion.

Pitting corrosion is a form of extremely localized corrosion that can take place in metal structures such as piping, leading to the creation of small holes in surfaces of the structures. Pitting can be extremely insidious, since it can cause little loss of material with a small effect on a metal surface while damaging the deep structure of the metal. This type of corrosion can occur in alloys that are protected by a protective film, such as tenacious (passivating) oxide film, which can include, for example, stainless steel, nickel alloys, and aluminum alloys, in environments that are exposed to damaging conditions. Damage to a protective film such as, for example, a corrosion-developed film, can take place in the field due to many factors, including, for example, mechanical scraping devices, fluid flow velocity, or chemical dissolution resulting in removing the protective films in specific areas resulting in creating active sites for localized corrosion to be initiated.

Pitting can be initiated by a small surface defect such as a hole or a local change in composition, or damage to a protective coating as a result of scraping by objects, mechanical devices or structures, fluid flow velocity, or chemical dissolution. As noted above, corrosive agents can include sulfide, hydrogen, oxygen, carbon dioxide, sulfates, carbonates, sodium chloride, potassium chloride, or other salts or compounds.

Pitting corrosion due to under deposit corrosion can occur where a corrosive agent (for example, wet hydrogen sulfide or carbon dioxide gas) is present between a metal surface and the protective film. Under deposit corrosion can depend on factors such as, for example, the kind of protective film, uniformity or thickness or age of the protective film, the type and concentration of corrosive agents present in the environment within which the metal structure exists or operates, the temperature or heat transfer properties of the metal in the metal structure, the flow rate or velocity of fluids that contact the protective film, or any other factors that can affect the protective film or corrosion of the metal structure in the environment within which it exists or operates.

Pitting corrosion, including pitting corrosion due to under deposit corrosion, can contribute to major corrosion failures experienced by industries such as oil and gas production or transportation. Currently, there is no standardized methodology to assess the effectiveness of corrosion inhibitors or protective films in cases where protective films are damaged, thereby leading to pitting corrosion. Generating pitting corrosion in a simulated laboratory environment is unattainable in short-term exposure, and unreproducible and uncontrollable in long-term exposure. Prior to the instant disclosure, there has been no solution that could accurately or comprehensively simulate pitting corrosion initiation in the presence of damaged anticorrosion films.

The instant disclosure provides a solution that includes an apparatus, a system, and a methodology for simulating localized pitting corrosion initiation, including pitting corrosion initiation due to under deposit corrosion, under field conditions that exist in industries such as, for example, oil and gas. The solution can include mimicking and assessing the consequences of damaged anticorrosion films that can lead to pitting corrosion. The damaged anticorrosion films can include, for example, carbonates, sulfides, oxides, or one or more inhibitors commonly used in oil and gas production or transportation to protect metal surfaces from corrosive agents. The solution can include assessing the impact of damage to an anticorrosion film in localized pitting corrosion under simulated field conditions. The solution can include assessing performance of corrosion inhibitors for protection against pitting corrosion. The solution can include assessing pitting corrosion initiation due to under deposit corrosion. The solution can include a corrosion simulation (CS) apparatus, a corrosion simulation and assessment (CSAA) system, or a corrosion simulation and assessment (CSAA) process.

Figure 2:
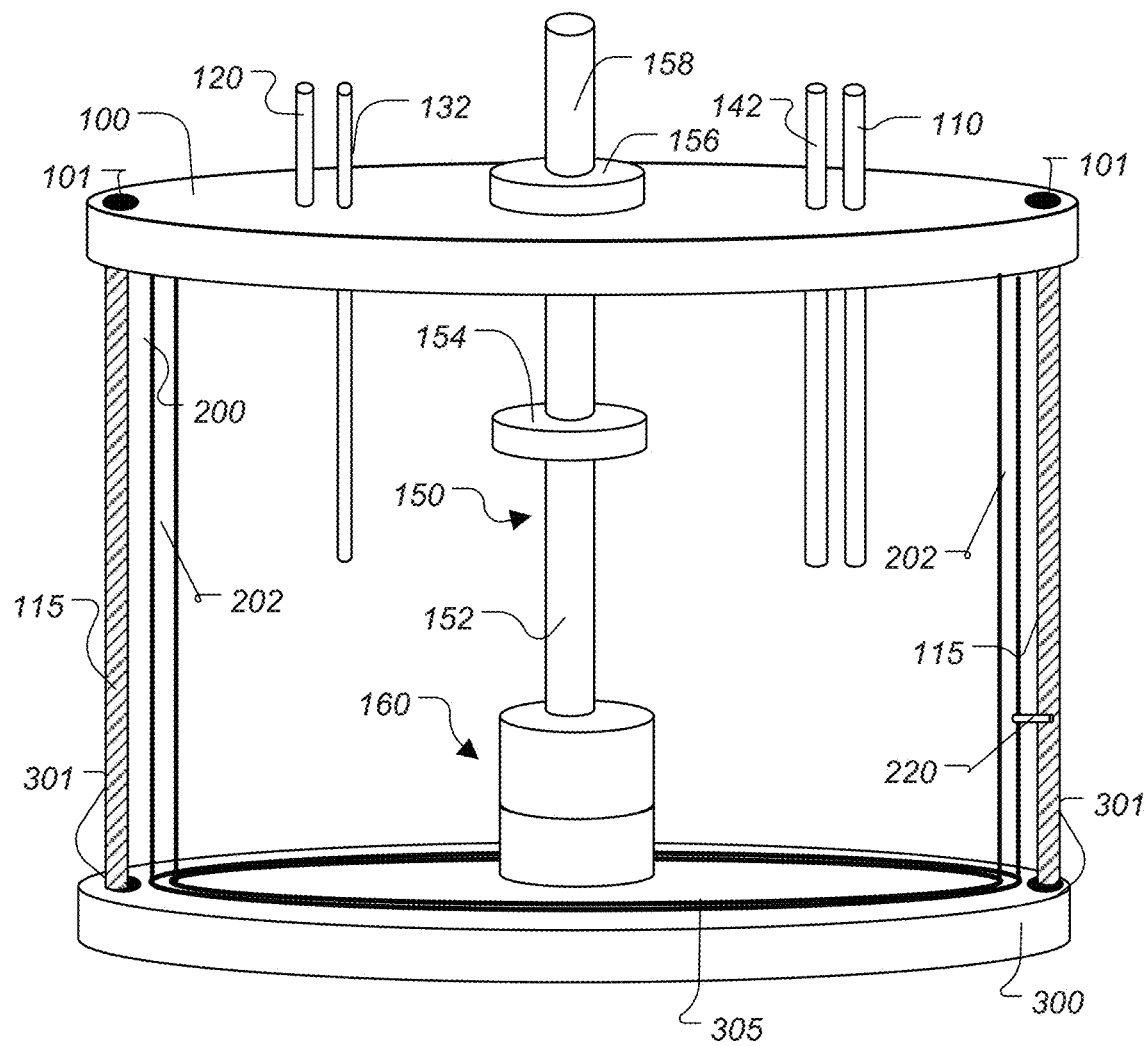
FIG. 2 shows a view of the CS apparatus in FIG. 1 after assembly.

FIGS. 1 and 2 show a partially disassembled (or exploded) view and an assembled view, respectively, of a non-limiting embodiment of a CS apparatus 1, constructed according to the principles of the disclosure. The CS apparatus 1 can generate pitting corrosion in short-term exposure with controlled anode to cathode area ratios. The CS apparatus 1 can simulate localized pitting corrosion initiation (including pitting corrosion initiation due to under deposit corrosion) under field conditions, including variations in cathode to anode ratios. The CS apparatus 1 can mimic and assess consequences of damaged corrosion films that can lead to pitting corrosion. The CS apparatus 1 can be included to generate mock-situ pitting corrosion in short-term exposure with controlled anode to cathode area ratios, including pitting corrosion and pitting corrosion due to under deposit corrosion, due to damaged film attributed to mechanical, chemical dissolution, or induced flow.

Figure 6:
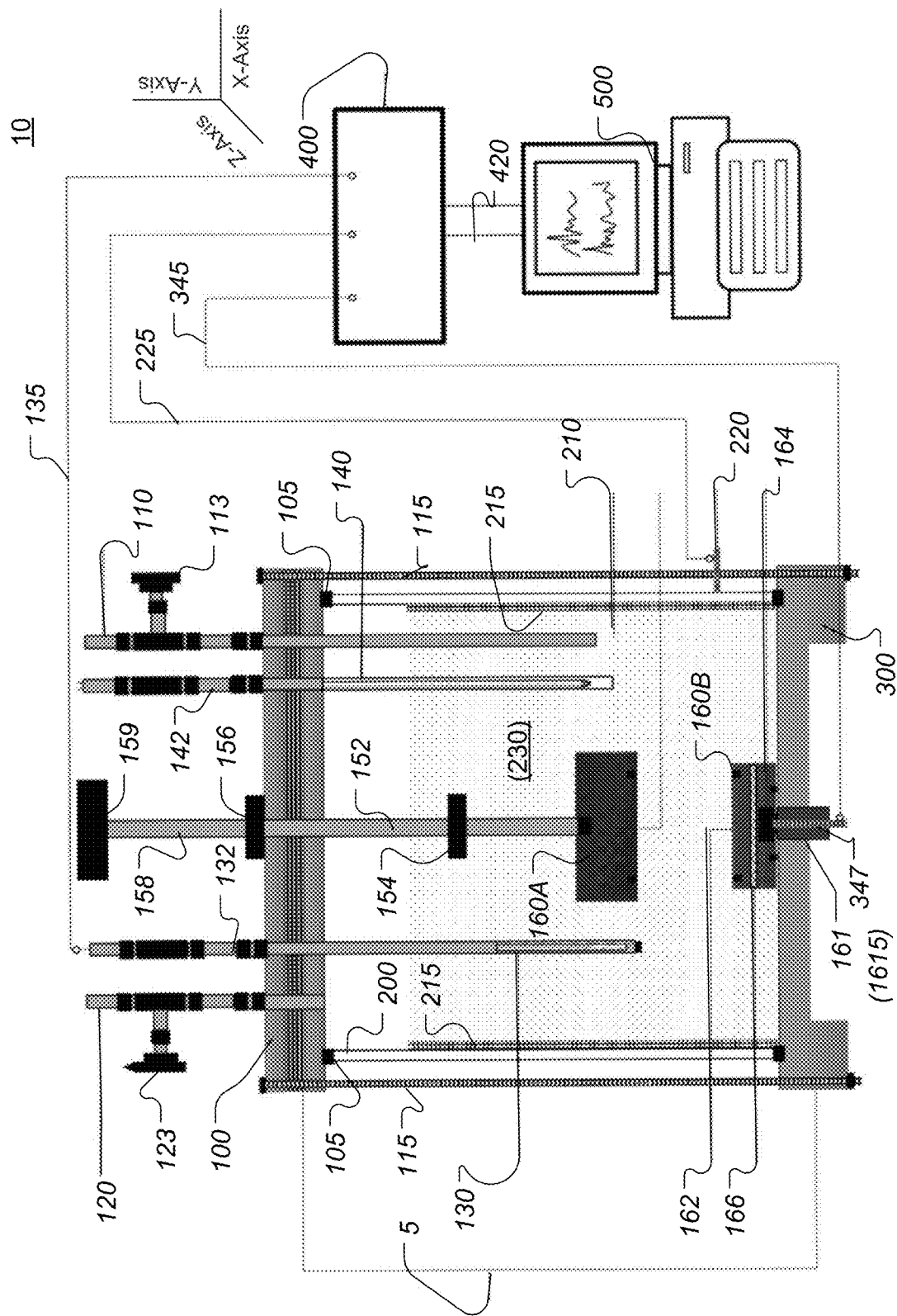
FIG. 6 shows a cross-cut view of an embodiment of a corrosion simulation and assessment (CSAA) system that is constructed according to the principles of the disclosure.

The CS apparatus 1 can be included in a corrosion simulation and assessment (CSAA) system such as, for example, the CSAA system 10 shown in FIG. 6. FIG. 6 shows a non-limiting embodiment of the CSAA system 10, which can include on-line monitoring for the effectives of corrosion inhibitors or film formation to mitigate damaged films in the field. The CS apparatus 1 and, more generally, the CSAA system 10 can correlate pitting corrosion (including pitting corrosions due to under deposit corrosion) rates with surface area ratios between cathode to anode sites, allowing for adjustment of anodic to cathodic area ratios.

Referring to FIGS. 1 and 2, the CS apparatus 1 can include a first (e.g., top) portion 100 and a second (e.g., bottom) portion 300. The CS apparatus 1 can include one or more fastener members 115. The first body portion 100 can include one or more fasteners 101 that can attach to one end of the respective one or more fastener members 115. The second body portion 300 can include one or more fasteners 301 that can be attached to another end of the respective one or more fastener members 115. The fasteners 101 or 301 can include an opening, a bolt, a screw, a nut, a clamp, a clip, a pin, a rod, a shaft, a tongue, a groove, an opening, or any device that can fasten an end of the fastener member 115 to the first body portion 100 or second body portion 300, respectively.

The CS apparatus 1 can be attached to or assembled with, for example, a pipe segment 200 between the first and second body portions 100, 300 and the one or more fastener members 115 to form a corrosion simulator (CS) cell 5 (shown in FIG. 6). The CS apparatus 1 can be configured to sandwich the pipe segment 200 between the first body portion 100 and second body portion 300 to provide a closed environment in CS cell 5. The closed environment in the CS cell 5 can be, for example, hermetically sealed to prevent any gas or liquid from leaking out of the CS cell 5.

The first body portion 100 can form a top for the CS cell 5. The first body portion 100 can be tightly clamped to one end of the pipe segment 200 and a seal member 105 (shown in FIG. 6) to prevent leakage of any solution between the first body portion 100 and pipe segment 200.

The second body portion 300 can form a bottom for the CS cell 5. The second body portion 300 can be tightly clamped to the other end of the pipe segment 300 and a seal member 305 to prevent leakage of the solution between the second body portion 300 and pipe segment 200. A coating, such as, for example, an epoxy coating, can be applied to a portion of an inner surface area of the pipe segment 200 to form an exclusion-control surface area to control the cathode area inside the pipe segment 200. The exclusion-control area can include a surface area in the pipe segment 200 that will not undergo pre-corrosion, also referred to below as an unwanted surface area.

The pipe segment 200 can include a section of pipe that is cut from a pipe (not shown) used to carry or transport a gas, a liquid, a solid, or any combination of a gas, liquid, or solid. The pipe segment 200 can include a material such as, for example, a metal or an alloy that includes carbon steel, austenitic, duplex stainless steel, or nickel based alloys. One or both of the first body portion 100 and second body portion 300 can be made to include the same material, or a different material than the pipe segment 200.

According to an alternative, non-limiting embodiment of the CS apparatus 1, the first body portion 100 or second body portion 300 can include a manifold (not shown) that includes one or more inlets that are configured to receive a gas or a liquid, and one or more outlets that are configured to deliver the received gas or liquid to a predetermined location.

FIG. 2 shows the wall of the pipe segment 200 as being cut away to show a cross-sectional portion 202 of the wall. As discussed below with reference to FIG. 6, a corrosion film 215 (shown in FIG. 6) can be formed on an inner surface portion of the wall of the pipe segment 200. The CS apparatus 1 can include an inlet such as, for example, a channel in an inlet conduit 110. The CS apparatus 1 can include an outlet such as, for example, a channel in an outlet conduit 120. The CS apparatus 1 can include a reference electrode 130 (shown in FIG. 6) and an anode case 160. The CS apparatus 1 can include a counter electrode 220. The anode case 160 can include a case cover 160A and a case base 160B, which can be separable from each other to provide access to an anode chamber formed by a recess in at least one of the case cover 160A and case base 160B. The counter electrode 220 can be formed with, or attached to the wall of the pipe segment 200, such as, for example, by welding the counter electrode 220 to a portion of the outer wall of the pipe segment 200.

The CS apparatus 1 can include a conduit 132 that can receive and hold the reference electrode 130, as seen in FIG. 6. The conduit 132 can be inserted through, attached to, or integrally formed with the first body portion 100. Alternatively, the reference electrode can be attached to the first body portion 100 or second body portion 300.

The CS apparatus 1 can include a sensor 140 (shown in FIG. 6), such as, for example, a thermocouple or thermoelectric device for measuring temperature, a pressure sensor, a pH sensor, or any other device that can measure a chemical, biological, or physical property inside the CS cell 5 (shown in FIG. 6). The CS apparatus 1 can include a conduit 142 that can receive and hold the sensor 140, as seen in FIG. 6. The conduit 142 can be inserted through, attached to, or integrally formed with the first body portion 100 (or the second body portion 300. Alternatively, sensors 140 can be attached to both the first body portion 100 and the second body portion 300.

The first body portion 100 can include one or more openings that can receive or attach to the inlet conduit 110, outlet conduit 120, reference electrode 130, or sensor 140. The first body portion 100 can include an opening that can receive and hold or attach to a case cover driver 150. One end of the case cover driver 150 can be attached to a portion of the case cover 160A. The case cover driver 150 can be formed as a single piece with the case cover 160A. The first body portion 100 can be configured to allow the case cover driver 150 to move with respect to the first body portion 100, such as, for example, along a longitudinal axis of the case driver 150 (e.g., y-axis, shown in FIG. 6). Another end of the case cover driver 150 can be attached through or to the first body portion 100.

In a non-limiting embodiment, the other end of the case cover driver 150 can be slidably attached through the first body portion 100 to a coupler 159 (shown in FIG. 6), thereby allowing the case cover driver 150 to slide along its longitudinal axis (y-axis) through the opening in the first body portion 100. The longitudinal axis (y-axis) of the case cover driver 150 can be substantially perpendicular to a plane of the first body portion 100 (e.g., x-z plane, shown in FIG. 6). The coupler 159 (shown in FIG. 6) can include a handle (not shown) for manual operation by a user's hand, or a yoke (not shown) or other coupling mechanism (not shown) that can attach to a driver (not shown) such as, for example, a piston, a motor, a pump, or other device that can apply a positive (or pushing) or a negative (or pulling) force to move the coupler 159 and, resultantly, the case cover driver 150 along its longitudinal axis (e.g., y-axis, shown in FIG. 6), thereby moving the case cover 160A toward or away from the case base 160B.

The case cover driver 150 can include a longitudinal member 152 such as, for example, a rod, a bar, or a shaft. The CS apparatus 1 can include one or more of a pull stop 154 and a push stop 156. The pull and push stops 154, 156 can include, for example, an O-ring, a c-clip, or any other device that can fasten to the longitudinal member 152. The pull and push stops 154, 156 can be affixed to the case cover driver 150 to limit movement of the case cover driver 150 with respect to the first body portion 100. The pull and push stops 154, 156 can be configured to provide a seal between the stop 154, 156 and first body portion 100 when in the full extended or fully retracted position, respectively. As seen in FIG. 2, the pull stop 154 can limit the case cover driver 150 from being withdrawn beyond a predetermined length from an outer surface of the first body portion 100; and, the push stop 156 can limit the case cover driver 150 from being pushed beyond a predetermined length from an inner surface of the first body portion 100, where the inner surface is substantially opposite to the outer surface of the first body portion 100.

As seen in the non-limiting embodiment shown in FIGS. 1 and 2, the first body portion 100 can include the inlet conduit 110 having an inlet and the outlet conduit 120 having an outlet. The inlet conduit 110 or outlet conduit 120 can include a valve 113 or valve 123 (shown in FIG. 6), respectively, that controls a rate at which a gas or liquid flows through the conduit 110/120, including stopping flow of the gas or liquid in the conduit 110/120. The conduit 110/120 can be inserted through, attached to, or integrally formed with the first body portion 100.

The first body portion 100 can include the seal member 105 (shown in FIG. 6). The seal member 105 can provide a hermetic seal between the first body portion 100 and the pipe segment 200. The seal member 105 can be provided separately. The seal member 105 can have any shape or size, including, for example, an annular shape. The seal member 105 can include, for example, an O-ring. The seal member 105 can have a shape and size that matches the shape and size of a contact surface of the pipe segment 200, so as to provide a hermetic seal between the seal member 105 and contact surface of the pipe segment 200 and between the seal member 105 and the first body portion 100. The seal member 105 can be integrally formed with or attached to the first body portion 100. The first body portion 100 can include a recessed portion (not shown) that can serve as a seat to receive and hold the seal member 105. Alternatively, the seal member 105 can be formed integrally with the first body portion 100, in which case the seal member 105 can be formed to be recessed, flush with, or protrude from a surface on the first body portion 100.

The second body portion 300 can include a seal member 305. The seal member 305 can be provided separate from the second body portion 300. The seal member 305 can be substantially the same as, or different from the seal member 105. The seal member 305 can have a shape and size that matches the shape and size of a contact surface of the other end of the pipe segment 200, opposite the end of the pipe segment that contacts the seal member 105. The seal member 305 can form a hermetic seal between the seal member 305 and contact surface of the pipe segment 200 and between the seal member 305 and the second body portion 300. The seal member 305 can be integrally formed with or attached to the second body portion 300. The second body portion 300 can include a recessed seat (not shown) that can receive and hold the seal member 305, or the seal member 305 can be formed integrally with the first body portion 100, in which case the seal member 305 can be formed to be recessed, flush with, or protrude from a surface on the second body portion 300.

The first body portion 100 can have any shape or size that includes a surface area that can cover and seal the entirety of an opening at one end of the pipe segment 200 to form a top (or bottom) for the CS cell 5 (shown in FIG. 6). The second body portion 300 can have any shape or size that includes a surface area that can cover and seal the entirety of another opening at the other, opposite end of the pipe segment 200 to form a bottom (or top) for the CS cell 5. The second body portion 300 can include an opening 315 that can receive a base protrusion 161 of the case base 160B. The opening 315 can be machined or formed in the second body portion 300.

The first body portion 100 can include a guide protrusion (not shown) or a guide recess (not shown) that can function to guide the contact surface of the pipe segment 200 to align with the seal member 105. For instance, the guide protrusion (not shown) can include an annular or partially annular wall structure (not shown) that protrudes a predetermined amount (for example, from a few millimeters to a few centimeters) above a surface of the first body portion 100 and matches the shape or size of the inner or outer perimeter of the pipe segment 200 or seal member 105, such that the wall structure (not shown) guides the inner or outer wall of the pipe segment 200 to align it with the seal member 105. The guide recess (not shown) can include an annular or partially annular groove or channel (not shown) that matches the shape or size of the wall end of the pipe segment 200 or seal member 105, such that the groove or channel can guide the wall of the one end of the pipe segment 200 to align with and contact the seal member 105. The guide protrusion or guide recess can have any shape or size that can guide and align an end of the pipe segment 200 with the seal member 105, so that the wall end perimeter of the pipe segment 200 contacts the seal member 105, thereby providing a hermetic seal.

The second body portion 300 can include a similar guide protrusion (not shown) or guide recess (not shown) to align the other end of the pipe segment 200 with the seal member 305, and to guide the end of the pipe segment 200 so that the perimeter of the end wall of the pipe segment end 200 comes into complete contact with the seal member 305 to provide a hermetic seal.

The opening 315 in the second body portion 300 can be configured to receive and hold the base protrusion 161. The opening 315 can be configured to receive and hold the base protrusion 161 to secure the case base 160B to the second body portion 300. Alternatively, the second body portion 300 can include a male portion (not shown) that can be received by a recess (not shown) formed in the case base 160B to secure the case base 160B to the second body portion 300. The base protrusion 161 can include a channel 1615 for an electrical device 347 (shown in FIG. 6) such as, for example, an electrode or a wire.

The case base 160B can include a sample holder 162 and a working electrode 164 (shown in FIG. 6). The working electrode 164 can include an anode coupon S (shown in FIG. 4). The working electrode 164 can include the anode coupon S and an electrical conductor 347 (shown in FIG. 6). The case base 160B can include a membrane 166 (shown in FIG. 3). The membrane 166 can include a non-conductive mesh.

Figure 3:
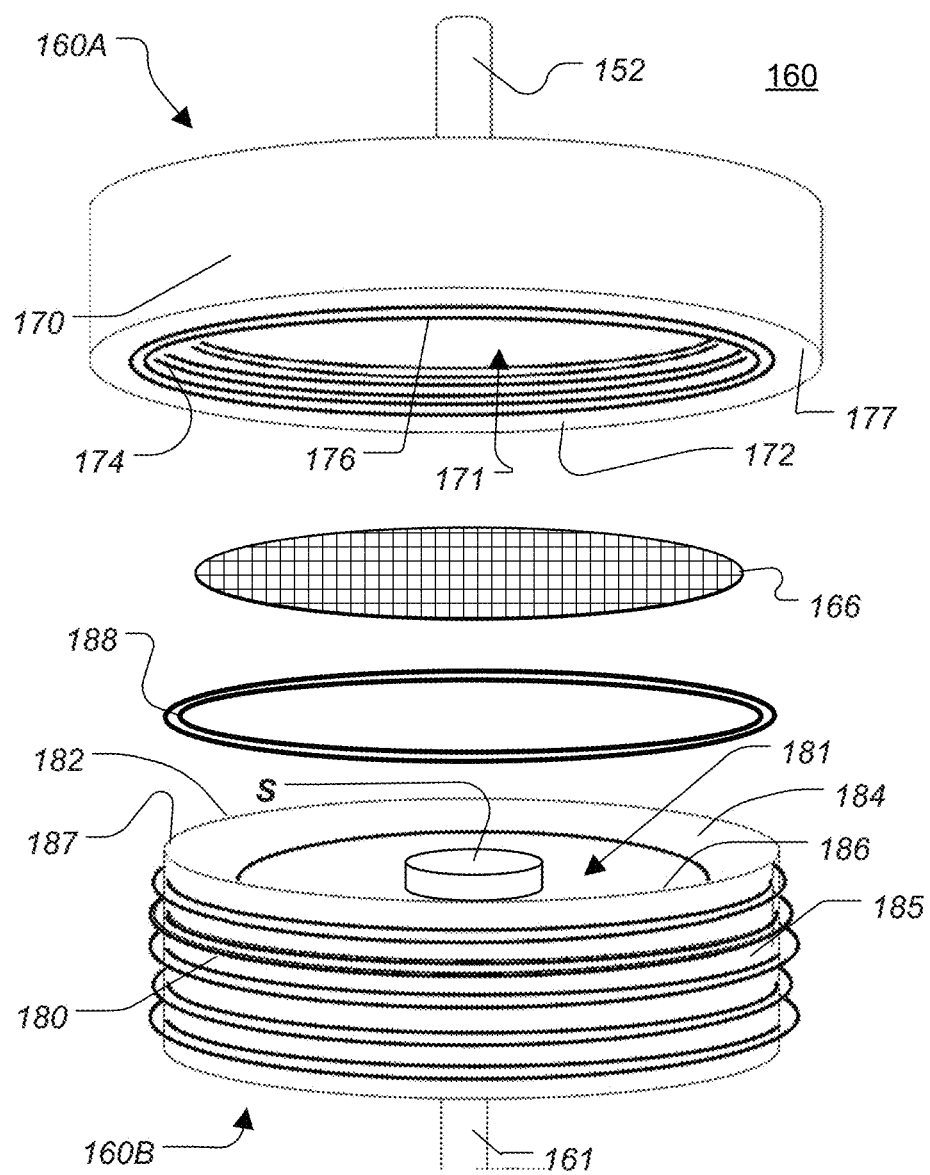
FIG. 3 shows a partially exploded view of an embodiment of an anode case that is constructed according to the principles of the disclosure.

FIG. 3 shows a non-limiting embodiment of the anode case 160, constructed according to the principles of the disclosure. The anode case 160 can include the case cover 160A and case base 160B, either or both of which can include a recessed portion that forms a part or the entire chamber within the anode case 160 when the case cover 160A and case base 160B are attached or assembled. Either or both of the case cover 160A and case base 160B can be made of a material such as polyetheretherketone (PEEK) or any other strong, durable, and impermeable material that displays high resistance amidst a wide range of chemical and physical environments, including at elevated temperatures. The chamber can include, for example, a recessed portion 171 formed in the case cover 160A and a recessed portion 181 formed in the case base 160B.

The case cover 160A or case base 160B can have any shape, including, for example, spherical, semi-spherical, rectangular, cylindrical, or any other shape that might be suitable for an application of the anode case 160. The case cover 160A or case base 160B can have any size that can be included in the CS cell 5 (shown in FIG. 6) without departing from the scope or spirit of the disclosure. As seen in FIG. 3, the case cover 160A and case base 160B can both have a substantially cylindrical shape.

The case cover 160A and case base 160B can be configured to attach securely to each other. The case cover 160A and case base 160B can each include threading that can engage and secure the case cover 160A to the case base 160B by, for example, turning the case cover 160A in a clockwise (or counter-clockwise) direction with respect to the case base 160B. In this embodiment, a perimeter of an inner wall 174 in the case cover 160A can be slightly larger than a perimeter of an outer wall 182 of the case base 160B, and both the inner wall 174 and outer wall 182 can include threading. Although shown with the thread being formed on the inner wall 174 in the case cover 160A and outer wall 182 of the case base 160B, the thread can be alternatively formed on outer wall (not shown) of the case cover 160A and on the inner wall (not shown) in the case base 160B.

Alternatively, the case cover 160A can be configured so that a lip 177 on the case cover 160A can contact and press against a lip 187 of the case base 160B. In this embodiment (not shown), the perimeter of the outer wall 182 of the case base 160B can be substantially equal to the outer perimeter of the case cover 160B. A seal member 188 can be affixed to or included in the case cover 160A or case base 160B to provide a hermetic seal between the case cover 160A and case base 160B, thereby hermetically sealing the chamber formed in the anode case 160 by the recessed portions 171, 181 in the case cover 160A and case base 160B.

The case cover 160A and case base 160B can include a fastener (not shown) such as, for example, a tongue-and-groove, a clip, or any other fastening mechanism that can allow the case cover 160A to attach to the case base 160B and detach from the case base 160B by application of a positive or negative force to the case cover 160A applied by the case cover driver 150 (shown in FIGS. 1 and 2).

As seen in the embodiment depicted in FIG. 3, the case cover 160A can include a cover body 170 that has an opening 172 leading to the recessed portion 171 formed in the cover body 170. The recessed portion 171 can be formed by the inner wall 174 and an end wall 176 in the cover body 170. The inner wall 174 can include threading. The inner wall 174 can have a cylindrical shape. The end wall 176 can include a flat surface, a spherical or semi-spherical surface, a circular surface, a rectangular surface, or any other two or three-dimensional shaped surface.

The case base 160B can include a base body 180 that has an opening 182 leading to the recessed portion 181 formed in the case body 180. The recessed portion 181 can be formed by an inner wall 184 and an end wall 186 in the case body 180. The case body 180 can include an outer wall 185. The outer wall 185 can include threading that can mate to or engage with the threading in the inner wall 174 of the case cover 160A. The outer wall 185 can have a cylindrical shape. An anode coupon S can be installed in the recessed portion 181. The end wall 186 can include a flat surface, a spherical or semi-spherical surface, a circular surface, a rectangular surface, or any other two or three-dimensional shaped surface. The end wall 186 can have the same or a different shape than the end wall 176.

The anode case 160 can include the membrane 166. The membrane 166 can include a mesh, a screen or another device that can cover the recessed portion 181 in the case body 16B. The membrane 166 can include a non-conductive or insulating material, such as, for example, plastic or rubber, that does conduct electricity. The membrane 166 can be attached to the case base 160B or sandwiched between the case cover 160A and case base 160B. The membrane 166 can be installed into or attached to the case base 160B for under deposit corrosion simulation or assessment, where actual field deposit in different thicknesses can be included in the testing matrix. The membrane 166 can be included to retain deposit from floating in, for example, electrolyte after exposing the anode area to the corrosive environment.

Figure 4:
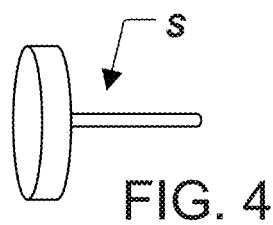
FIG. 4 shows an example of an anode coupon that can be included in the anode case in FIG. 3.

FIG. 4 shows a non-limiting embodiment of the anode coupon S, constructed according to the principles of the disclosure. The anode coupon S can be made of the same material as the pipe segment 200 (shown in FIGS. 1, 2 and 6). The anode coupon S is also referred to herein as an anode sample or a test sample. The anode coupon S can be used as a fresh expose material. The anode coupon S can include a head portion and a stem portion.

The head portion of the anode coupon S can include an anode area that has a surface area of an artificial pit. The anode area can be, for example, about 0.04 $cm^2$, about 7.5 $cm^2$, about 16.6 $cm^2$, or another surface area, depending on the application of the CS apparatus 1, as will be understood by those skilled in the art.

The stem portion can be inserted in, for example, the channel 1615 (shown in FIGS. 5 and 6) in the base protrusion 161. The case body 180 can include (or be attached to) the base protrusion 161. The stem portion of the anode coupon S can be connected to an electrical conductor 347 (shown in FIG. 6). The electrical conductor 347 or the anode coupon S can function as the working electrode. The electrical conductor 347 or anode coupon S can be connected to the communication link 345, which can include, for example, an electrical wire that connects to the CSAA processor 400 (shown in FIG. 6).

Figure 5:
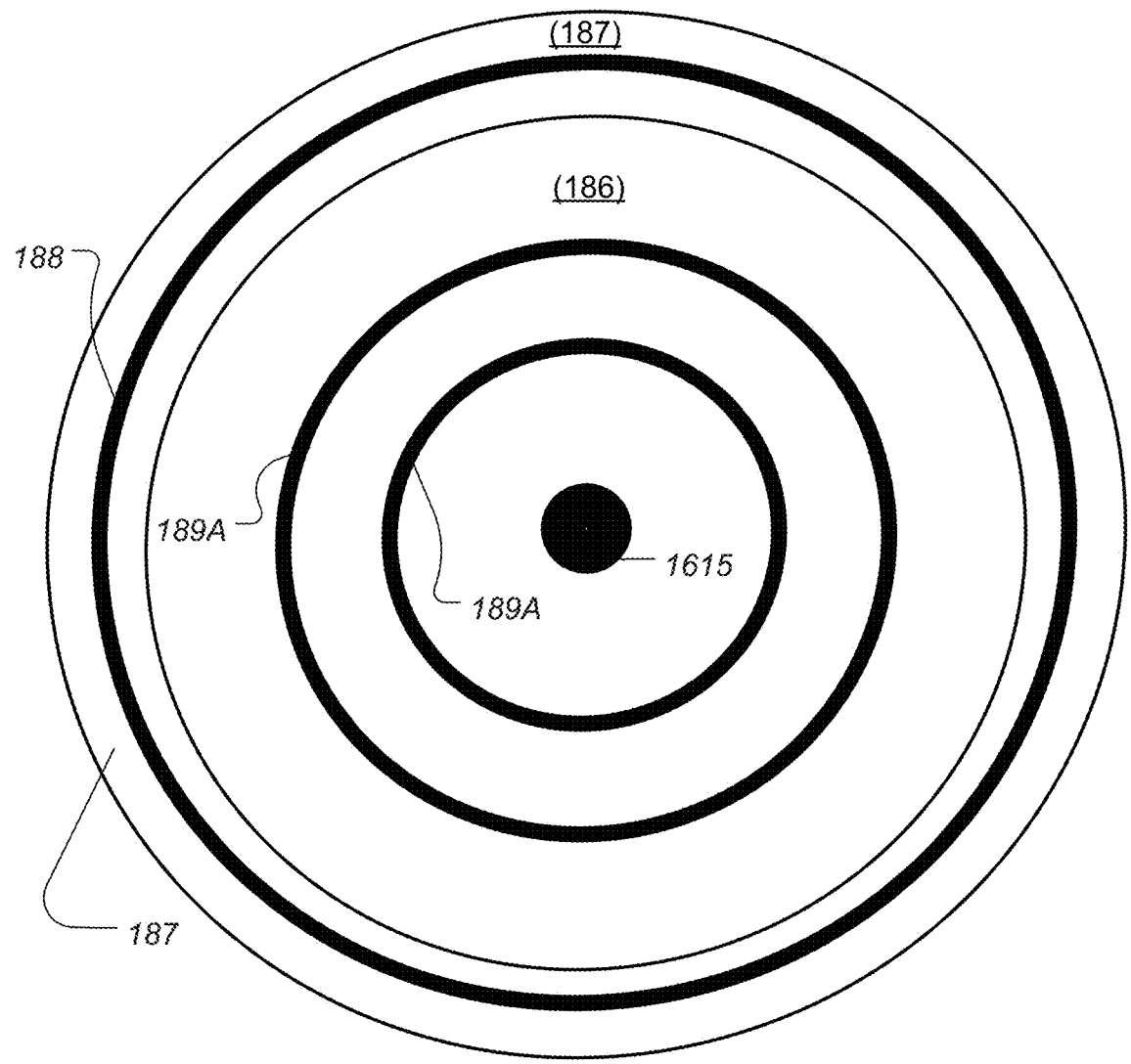
FIG. 5 shows a non-limiting embodiment of a case base that can be included in the anode case in FIG. 3.

FIG. 5 shows a top-down view of a non-limiting embodiment of the case base 160B, looking into the recessed portion 181 in the case base 160B. In addition to the seal member 188, the case base 160B can include one or more additional seal members. Each seal member can be configured to accommodate a different size of an anode coupons S. In the embodiment shown in FIG. 5, the case base 160B includes two additional seal members seal members 189A, 189B. The seal members 189A, 189B can be removably or permanently affixed to the end wall 186 in the case base 160B. The seal members 189A, 189B can be made integral with the case base 160B. The seal members 189A, 189B can serve as seating surfaces for varying sizes of anode coupons S. The channel 1615 can receive and hold different sizes of anode coupons S.

The case base 160B shown in FIG. 3 can differ from the case base 160B shown in FIG. 5. For instance, the base 160B in FIG. 5 can include the channel 1615 and a number (e.g., two in this example) of seal members 189A, 189B (e.g., O-rings) to accommodate different sized anode coupons S, such as, for example, small anode samples made of the same material as the pipe segment 200. Whereas the base 160B shown in FIG. 3 can include the membrane 166 without the seal members 189A, 189B. Both embodiments of the case base 160B can include the perimeter seal member 188 to form a vacuum (or hermetic) seal with the case cover 160A. Alternatively, the membrane 166 and/or seal members 189A, 189B can be removable, so that the same case base 160B can be used for UDC or pitting corrosion simulation.

Referring to FIG. 6, the CSAA system 10 can include, in addition to the CS apparatus 1, a corrosion simulation and assessment (CSAA) processor 400 and a computing device 500. The CSAA processor 400 can be connected to the reference electrode 130, working electrode 164, and counter electrode 210 via respective communication links 135, 345, and 225. As noted earlier, the working electrode can include the anode coupon S. The CSAA processor 400 can be connected to the sensor 140 via a communication link (not shown). The CSAA processor 400 can include one or more signal input terminals and one or more signal output terminals. The signal input terminal(s) can be connected to communication links 135, 225, 345.

In the CSAA system 10, the anode case 160 can hold different types or sizes of anode coupons S (e.g., shown in FIG. 4). When installed in the anode case 160, the anode coupon can work as an anodic test sample or artificial pit. The anode case 160 can isolate the anode coupon S during a pre-corroding stage from a surrounding corrosive environment in the CS cell 5 (shown in FIG. 6) that can be created by a simulation solution 230, while leaving the cathode surface area of the inner wall of the pipe segment 200 to corrode during a pre-corrosion process to form a stable corrosion product or chemical inhibition film on the exposed cathode surface area of the inner wall of the pipe segment 200.

The CSAA processor 400 can be connected to a communicating device 500. The communicating device 500 can be connected to the one or more signal output terminals in the CSAA processor 400. The CSAA processor 400 can include, among other things, a potentiostat, a galvanostat, and a zero-resistance-ammeter (ZRA). The CSAA processor 400 can be provided as a stand-alone device or included in the communicating device 500.

The CSAA system 10 can be employed to generate laboratory pitting corrosion in short-term exposure with a fully controlled anode to cathode area ratio. The CSAA system 10 can simulate pitting corrosion initiation (including pitting corrosion due to UDC) under field conditions, which can occur due to damaged film attributed to mechanical, chemical dissolution, or induced flow. The CSAA system 10 can provide on-line monitoring and selection of effective corrosion inhibitors or film formation to mitigate damaged films in the field. The CSAA system 10 can correlate pitting corrosion rate with adjustable surface area ratios between cathode to anode sites.

Figure 7:
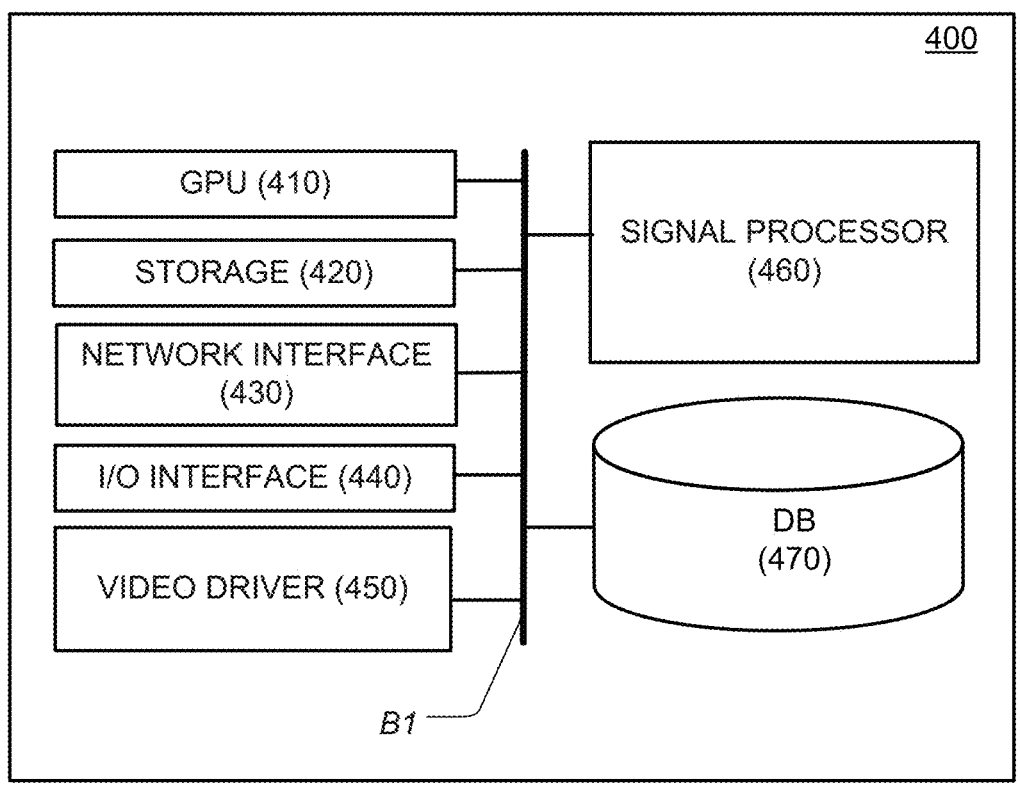
FIG. 7 shows a block diagram of a non-limiting embodiment of a corrosion simulation and assessment (CSAA) processor that can be included in the CSAA system shown in FIG. 6.

FIG. 7 shows a non-limiting embodiment of the CSAA processor 400. The CSAA processor 400 can include a graphic processing unit (GPU) 410, a storage 420, a network interface 430, an input/output (I/O) interface 440, a video driver 450, and a signal processor 460. The CSAA processor 400 can include a database 470, which can be provided a separate device or as part of the storage 420. The database 470 can be located external to the CSAA processor 400. The components in the CSAA processor 400 can be connected to a backbone B1 by means of one or more communication links.

The GPU 410 can include any of various commercially available graphic processors, processors, microprocessors or multi-processor architectures. The GPU 410 can include a plurality of GPUs that can execute computer program instructions in parallel. The GPU 410 can include a central processing unit (CPU) or a plurality of CPUs arranged to function in parallel.

Figure 8:
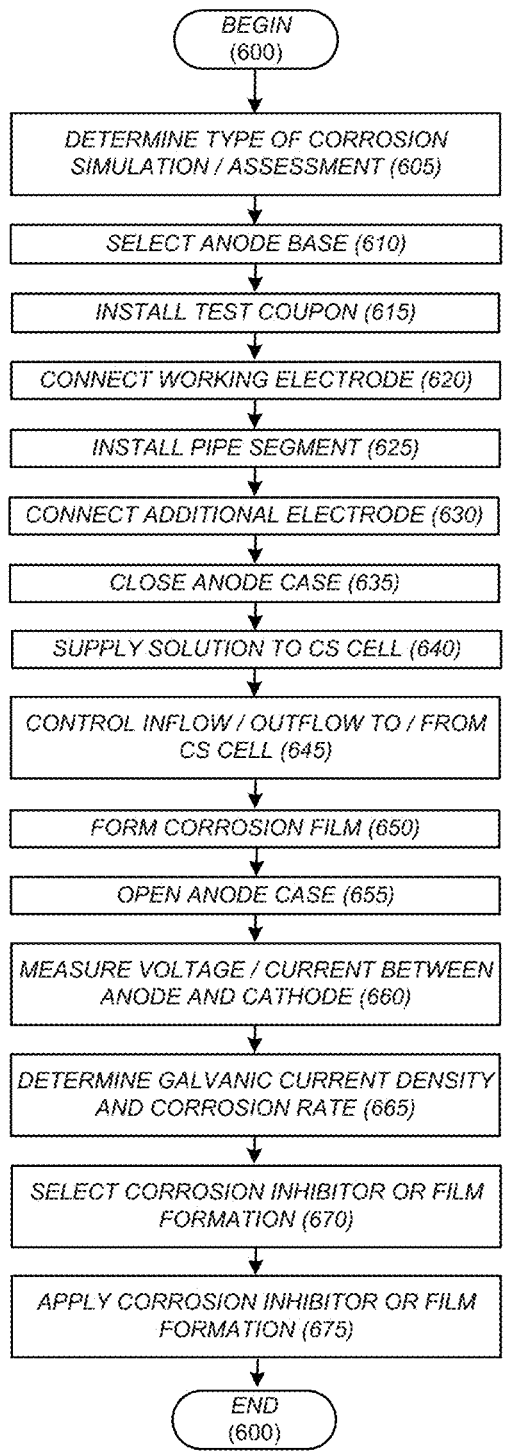
FIG. 8 shows an embodiment of a corrosion simulation and assessment process, according to the principles of the disclosure.

The CSAA processor 400 can include a computer-readable medium that can hold executable or interpretable computer code (or instructions) that, when executed by the GPU 410, causes the steps, processes and methods described in this disclosure to be carried out, including the corrosion simulation and assessment process 600 (shown in FIG. 8). The computer-readable medium can be included in the storage 420, or an external computer-readable medium connected to the CSAA processor 400 via the network interface 430 or the I/O interface 440.

A basic input/output system (BIOS) can be stored in a non-volatile memory in the CSAA processor 400, such as, for example, in the storage 420. The BIOS can contain the basic routines that help to transfer information between computing resources within the CSAA processor 400, such as during start-up.

The storage 420 can include a read-only memory (ROM), an erasable programmable read-only memory (EPROM), an electrically erasable programmable read-only memory (EE-PROM), a random-access memory (RAM), a non-volatile random-access memory (NVRAM), a burst buffer (BB), or any other device that can store digital data and computer executable instructions or code.

A variety of program modules can be stored in the storage 420, including an operating system (not shown), one or more application programs (not shown), application program interfaces (APIs) (not shown), program modules (not shown), or program data (not shown). Any (or all) of the operating system, application programs, APIs, program modules, or program data can be cached in the storage 420 as executable sections of computer code.

The network interface 430 can be connected to a network (not shown). The network interface 430 can include a wired or a wireless communication network interface (not shown)

or a modem (not shown). When communicating in a local area network (LAN), the CSAA processor 400 can be connected to the LAN network through the wired or wireless communication network interface; and, when communicating in a wide area network (WAN), the CSAA processor 400 can be connected to the WAN network through the modem. The modem (not shown) can be internal or external and wired or wireless. The modem can be connected to the backbone B1 via, for example, a serial port interface (not shown).

The I/O interface 440 can receive commands and data from, for example, an operator via a user interface device (not shown), such as, for example, a keyboard (not shown), a mouse (not shown), a pointer (not shown), a microphone (not shown), a speaker (not shown), or a display (not shown). The received commands and data can be forwarded to the GPU 410 from the I/O interface 440 as instruction and data signals via the backbone B1.

The video driver 450 can include a graphics driver (not shown), a video adaptor (not shown), or any other device necessary to render an image signal on a display device, such as, for example, in the communicating device 500 (shown in FIG. 6).

The signal processor 460 can include a potentiostat, a galvanostat, a ZRA, or any other electroanalytical device capable of measuring or controlling voltage differences between different electrodes, or electrical currents such as, for example, galvanic currents. The signal processor 460 can include a single or multiple devices or modules. The signal processor 460 can be located separate from the CSAA processor 400. The signal processor 460 can include state-of-the-art digital or analog components. The signal processor 460 can be connected to, for example, a research grade electrochemical instrument that is located external to the CSAA processor 400, which can be located locally or remotely with the CSAA processor 400. The signal processor 460 can receive electrical signals from the reference electrode 130 (shown in FIG. 6), working electrode 164 (shown in FIG. 6) or counter electrode 220 (shown in FIG. 6).

The database 470 can store modelling data such as, for example, data relating to properties or characteristics of anticorrosion films or materials used for pipe segments (e.g., pipe segment 200, shown in FIG. 6). The database 470 can store historical data, including past simulations and assessments, pre-corrosion times for each cathode surface area simulated, dimensions of the cathode surface area, dimensions of the exclusion-control (or unwanted) surface area, exposure time for each anode coupon tested, dimensions of the anode coupon, properties of the surrounding corrosive environment (e.g., temperature, pressure, pH), ingredients in the simulation solution 230, properties of the simulation solution 230, date/time of the simulation or assessment, voltage measurements at each electrode, and current measurements at each electrode.

FIG. 8 shows an embodiment of a corrosion simulation and assessment process 600, according to the principles of the disclosure. The process 600 can be executed in-part by or under control of the processor 400 with user intervention, or entirely without any user intervention, in which case a robotic device (not shown) can be included to carry out the physical processes and procedures according to the disclosure. As noted above, the CSAA processor 400 (shown in FIGS. 6 and 7) can include a computer-readable medium that can hold executable or interpretable computer code (or instructions) that, when executed by the GPU 410, causes the steps in process 600 (with or without user intervention) to be carried out. In case the process 600 is executed entirely without user intervention, the robotic device (not shown) can be configured to operate under control of the processor 400, in which the case the process 400 can include one or more drivers (not shown) to operate the robotic device (not shown).

The process 600 can begin by determining whether a simulation or assessment is to be carried out for pitting corrosion simulation or pitting corrosion due to under deposit corrosion ("UDC") (Step 605). Based on the determination of the type of corrosion to be simulated or assessed (e.g., pitting or UDC corrosion), a case base 160B can be selected (Step 610). For example, if it is determined that pitting corrosion is to be simulated or assessed (Step 605), then a case base 160B without the membrane 166 (shown in FIG. 3) can be selected (Step 610). However, if it is determined that UDC is to be simulated or assessed (Step 605), then a case base 160B with the membrane 166 (shown in FIG. 3) can be selected (Step 610). The membrane 166 can hold deposit within the recessed portion 181 and prevent the deposit from floating into a simulation solution 230.

Alternatively, if the case base 160B is integrated with the second portion 300 (e.g., built as one piece, or fixedly attached), then the membrane 166 can be installed or removed from the case base 160B (Step 610), depending on the type of corrosion to be simulated or assessed (Step 605).

With the appropriate case base 160B in place, an anode coupon S (e.g., shown in FIG. 4) can be selected and installed into the case base 160B (Step 615). The anode coupon S can have an anode surface area (e.g., surface area of an artificial pit) of, for example, about 0.04 cm$^2$, about 7.5 cm$^2$, about 16.6 cm$^2$, or any other appropriate surface area, depending on the application of the CS apparatus 1, as understood by those skilled in the art.

For pitting corrosion simulation or assessment, the anode coupon S can be inserted, for example, with the stem portion down and into the channel 1615 (shown in FIGS. 5 and 6) in the case base 160B. For UDC simulation or assessment, the non-conductive membrane 166 (shown in FIG. 3) can be installed above a test matrix placed in the recessed portion 181. The test matrix can be installed in the recessed portion 181 in the case base 160B. The test matrix can have any shape or size, including, for example, a rectangular plate, a circular disk, or any other two or three-dimensional shape that can be vacuum sealed and held in the anode case 160. The test matrix can include the anode coupon S. The test matrix can include different thicknesses of actual field deposit. A non-conductive sealant can be added and placed atop of the membrane 166 to hermetically seal a chamber that is formed by the recessed portion 181 (shown in FIG. 3) in the case base 160B, below the membrane 166.

In an alternative embodiment, where the case base 160B is removable from the second portion 300, the anode coupon S can be installed into the case base 160B and the case base 160B with anode coupon S can be attached to the second portion 300 (Step 615) by, for example, inserting the base protrusion 161 of the case base 160B (shown in FIG. 1) into the opening 315 in the second portion 300 (shown in FIG. 1) (Step 615). In this embodiment, the case base 160B can include the membrane 166 and sealant preinstalled for UDC simulation or assessment, such that the case base 160B with anode coupon S hermetically sealed in the chamber (formed by the recessed portion 181 and membrane 166) can be attached to the second portion 300 (Step 615).

An end of the communication link 345 can be connected to the stem portion of the anode coupon S (shown in FIG. 5) or the electrical conductor 347 (shown in FIG. 6) (Step 620).

The end of the communication link 345 can be connected to the anode coupon S by an electrically conductive fastener (not shown), such as, for example, a weld, a clip, a clamp, a pin, or a socket. The electrically conductive fastener (not shown) can be formed with, or attached to the base protrusion 161 and aligned with the channel 161S to receive and contact the stem portion of the test coupon S. The electrically conductive fastener (not shown) can include the electrical conductor 347 (shown in FIG. 6).

The other end of the communication link 345 can be connected to the processor 400, such as, for example, a working electrode (WE) signal input terminal in the processor 400. Referring to the embodiment of the processor 400 shown in FIG. 7, the communication link 345 can be connected to a WE signal terminal in the signal processor 460, which, as discussed above, can include a ZRA potentiostat (not shown).

A pipe (not shown) that is to be simulated or assessed for pitting corrosion or UDC can be cut to provide the pipe segment 200. A protective coating (e.g., epoxy) can be applied to a portion of the inner wall surface to exclude an unwanted surface area (the exclusion-control surface area) and to control a cathode surface area inside the pipe segment 200. The unwanted surface area can be inversely proportional to the cathode surface area, and the sum of the unwanted surface area and cathode surface area can equal to the total surface area inside the pipe segment 200. The unwanted surface area can be the portion of the inner wall surface of the pipe segment 200 that will not be exposed to the simulation solution 230 (shown in FIG. 6).

The cathode surface area can include the surface area of the inner wall of the pipe segment 200 that will be exposed to the simulation solution 230. When the inner wall surfaces of the pipe segment 200 are exposed to the simulation solution 230, the surfaces will be pre-corroded and covered with stable corrosion products or a chemical inhibition film, thereby forming a cathode site. As described below, when the anode case 160 is opened to expose an uncorroded anode coupon S, the anode coupon S will act as an anode to the surrounding corrosive environment created by the simulation solution 230. The cathode electrode 220 and anode coupon S can be connected to the processor 400 via communication links 225 and 345 to measure and monitor the galvanic current and voltage potential between the anode and cathode sites. The galvanic current density and corrosion rate can then be calculated.

The following Table 1 (cathode/anode ratios) illustrates three different examples of cathode area to anode area ratios ($R_{CA-AA}$) where the cathode surface area ($T_{CSA}$) of the pipe segment 200 is 1116 cm$^2$ ($T_{CSA}$=1116 cm$^2$) and A1, A2, and A3 are three different surface area values (0.04 cm$^2$, 7.5 cm$^2$, 16.6 cm$^2$) of anode surface area $T_{ASA}$ of the anode coupon worked as fresh expose material in cm$^2$. The ratio $R_{CA-AA}$ can be determined by dividing the total cathode surface area $T_{CSA}$ (e.g., 1116 cm$^2$) by the anode surface area $T_{ASA}$ (e.g. 0.04 cm$^2$, 7.5 cm$^2$, or 16.6 cm$^2$) of the anode coupon S included in the CS cell 5.

TABLE 1

| CATHODE/ANODE RATIOS | | | |
| --- | --- | --- | --- |
|  | A1 | A2 | A3 |
| Available Anode Surface Area (e.g., surface area of test coupon S head) | 0.04 | 7.5 | 16.6 |
| Ratio of Cathode Area to Anode Area | 28000 | 150 | 70 |

In real-world applications, the cathode surface area can simulate the film layer(s) formed onto the internal surfaces of pipes, and the anode surface areas (e.g., A1, A2, or A3) can be used as fresh surface areas that can simulate film damage areas in those pipes.

Referring to FIGS. 1 and 2, the pipe segment 200 can be placed between the first portion 100 and second portion 300 (Step 625). One end of the pipe segment 200 can be aligned with and placed on top of the seal member 305 to form a leakage proof seal between the pipe segment 200 and second section 300. The other end of the pipe segment 200 can be aligned with the seal member 105 (shown in FIG. 6), and the first section 100 can be affixed to the pipe segment and second section 300 to form a leakage proof seal between the pipe segment 200 and the first section 100. The one or more fastener members 115 can be adjusted to secure the first section 100, pipe segment 200 and second section 300 to each other to form the CS cell 5 (shown in FIG. 6). In this regard, one or more of the fasteners 101 or 301 can be adjusted (for example, screwed or turned) to draw the first portion 100 and second portion 200 toward each other to sandwich the pipe segment 200 tightly between them by shortening the length of the fastener member(s) 115 between the first and second portions 100, 300.

An end of the communication link 225 can be connected to the counter electrode 220 (shown in FIG. 6) on the pipe segment 200 (Step 630). The counter electrode 220 can be attached to a portion of the wall of the pipe segment 200 by a fastener (not shown) such as, for example, a weld, a bolt, a screw, a clip, a clamp, a pin, a rod, or a socket, or the counter electrode 220 can be screwed into the wall of the pipe segment 200. The electric line 225 can be connected to the counter electrode 220 by means of an electrically conductive fastener (not shown), such as, for example, a weld, a clip, a clamp, a pin, or a socket.

The other end of the communication link 225 can be connected to the processor 400, such as, for example, a counter electrode (CE) signal input terminal in the processor 400. Referring to the embodiment of the processor 400 shown in FIG. 7, the communication link 225 can be connected to a CE input terminal in the signal processor 460, which, as discussed above, can include the ZRA potentiostat (not shown).

If not already connected, an end of the communication link 135 can be connected to the reference electrode 130 (shown in FIG. 6) (Step 630). The communication link 135 can be formed integral with the reference electrode 130, or attached to the reference electrode 130 by means of the same (or different) electrically conductive fastener used to connect the communication link 225 to the counter electrode 220.

The other end of the communication link 135 can be connected to the processor 400, such as, for example, a reference electrode (RE) signal input terminal in the processor 400. Referring to the embodiment of the processor 400 shown in FIG. 7, the communication link 135 can be connected to an RE input terminal in the signal processor 460.

The case cover 160A (shown in FIG. 3) can be moved toward to the case base 160B (shown in FIG. 3) to hermetically seal the chamber formed by the recessed portions 171 and/or 181 (Step 635). In the embodiment of the case cover 160A that includes threading on an inner wall and the case base 160B that includes threading on an outer wall (shown in FIG. 3), the case cover 160A can be turned clockwise (or counterclockwise) with respect to the case base 160B to attach and secure the case cover 160A to the case base 160B. For example, the case cover driver 150 (shown in FIGS. 1, 2, and 6) can be moved toward the case base 160B until the case cover 160A contacts the case base 160B and, then, the case cover driver 150 can be turned clockwise (or counter-clockwise) to turn the case cover 160A until the case cover 160A is firmly secured to the case base 160B. With the case cover 160A secured to the case base 160B, the hermetically-sealed chamber in the anode case 160 can isolate the anode coupon S from the surrounding corrosive environment in the CS cell 5 (shown in FIG. 6).

After the CS cell 5 (shown in FIG. 6) is assembled and secured and the chamber in the anode case 160 sealed tight, the simulation solution 230 (shown in FIG. 6) can be supplied into the CS cell 5 via the inlet conduit 110 (Step 640). The simulation solution 230 can include any combination of a gas, liquid, or solid that can simulate field conditions, including, for example, concentration, fluid velocity, fluid rate, corrosion rate (e.g., oxidation rate), pH level, temperature, pressure, or any other field conditions that might be encountered by any structure that includes the same material as the pipe segment 200. The simulation solution 230 can include an electrolyte (e.g., a synthetic brine), air, oxygen, hydrogen-sulfide, carbon-dioxide, or any other compound or composition that can simulate field conditions. The inlet conduit 110 can facilitate purging simulation solution 230 or any gas, liquid or liquid-solid mixture from the CS cell 5 by, for example, purging the volume in the CS cell 5 with a desired gas composition (e.g., air).

When the level of simulation solution 230 in the CS cell 5 reaches a predetermined amount (e.g., about 80% of capacity, shown in FIG. 6), the supply of simulation solution 230 to the CS cell 5 can be turned off (Step 645). The supply can be turned off by closing the valve 113 on the inlet conduit 110 (shown in FIG. 6). The valve 113 can include an electrically controlled valve that can be operated and controlled by the processor 400, or a manual valve that can be operated by a user. Supply can be turned on by opening the valve 113, and the rate of flow into the CS cell 5 can be controlled by adjusting the valve 113 to increase or decrease the amount and rate of gas, liquid, or solid flowing through the inlet conduit 110. Simulation solution 230 can be removed from the CS cell 5 by supplying a pressurized gas, liquid, or solid to the CS cell 5 via the inlet conduit 110 and allowing the simulation solution to be evacuated from the CS cell 5 via the outlet conduit 120 (shown in FIG. 6). The pressurized gas can include air. The pressurized liquid can include water. The solid can include a corrosive salt.

The valve 123 (shown in FIG. 6) can be adjusted to control outflow of gas, liquid or solid from the CS cell 5 through the outlet conduit 120. The valve 123 can include an electrically controlled valve (not shown) that can be controlled by the processor 400, or a manual valve (not shown) that can be operate by the user.

By controlling the valves 113 and 123, as well as the type and properties of the influent(s) to the CS cell 5, an environment can be created in the CS cell 5 that simulates real-world field conditions, including, for example, pH, temperature, pressure, hydrogen-sulfide gas (e.g., mole %), or carbon-dioxide (e.g., mole %) (Step 645). The CS system 10 can include additional valves (not shown) and conduits (not shown) to control the gas, liquid, or solid that make up the simulation solution 230. The CS apparatus 1 (including CS cell 5) can generate laboratory pitting corrosion in short-term exposure with a fully controlled anode to cathode area ratio. The CS apparatus 1 can simulate pitting corrosion initiation in the field that might result from or be attributed to, among other things, damaged film, including damaged film attributed to mechanical, chemical dissolution, or induced flow. In the CS apparatus 1, pitting corrosion rate can be correlated with the surface area ratios between cathode to anode sites in the CS cell 5.

The internal wall of the pipe segment 200, which serves as a cathode, can be allowed to undergo pre-corrosion to form a stable corrosion and chemical inhibition film 215 on the exposed pipe wall (shown in FIG. 6) (Step 650). In order to simulate field pitting corrosion conditions, the pre-corrosion stage (Step 650) should be long enough to simulate field conditions prior to exposing the anode coupon S to the corrosive environment formed by the simulation solution 230.

At the conclusion of the pre-corrosion stage (Step 650), the anode case 160 can opened to expose the anode coupon S to the corrosive environment (Step 655). The anode coupon S will act as an anode or working electrode in the surrounding corrosive environment. For UDC simulation or assessment, the membrane 166 (shown in FIG. 3) can allow actual field deposits in different thicknesses to be included in the testing matrix. In this regard, the membrane 166 can keep deposit from floating into the simulation solution 230 after exposing the anode surface area to the corrosive environment.

The voltage potential between the cathode electrode 220 and the anode coupon S can be measured and monitored by the processor 400 by, for example, measuring and monitoring the voltage potential between the electrical lines 225 and 345, respectively (shown in FIG. 6) (Step 660). The galvanic current between the anode coupon S and cathode sites in the wall of the pipe segment 200 can be measured and monitored by the processor 400 (Step 660) by, for example, measuring and monitoring the voltage potentials or currents in the communication links 225 and 345. The voltage potential and galvanic current can be measured and monitored by, for example, the ZRA in the processor 400.

Figure 9:
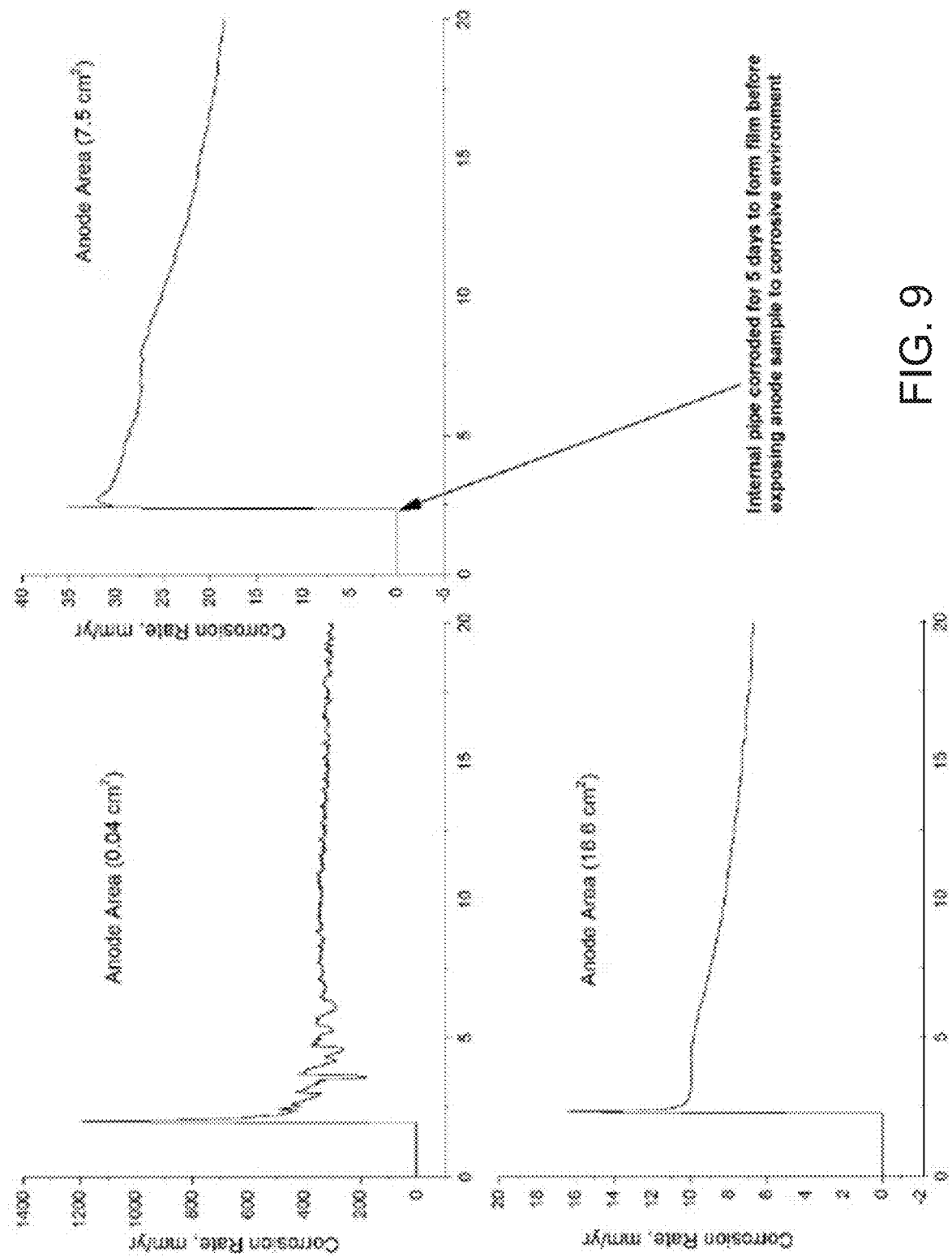
FIG. 9 shows diagrams illustrating three different examples of corrosion rates determined by the CSAA system shown in FIG. 6.

Based on the measured voltage potential and galvanic current, the processor 400 can determine the galvanic current density and corrosion rate (Step 665). The diagrams in FIG. 9 illustrate non-limiting examples of corrosion rates determined by the CSAA system 10 (shown in FIG. 6) using anode coupons made of the same material but having the three different surface areas A1, A2, and A3 in Table 1 (discussed above). As seen in each of the diagrams, the corrosion rate in millimeters-per-year (mm/year) remained at zero (0) during the pre-corrosion stage. After exposing the inner wall of the pipe segment 200 to the simulation solution 230 for about five (5) days to form a corrosion film 215 (shown in FIG. 6) on the cathode surface area, the anode case 160 was opened to expose the anode coupon to the surrounding corrosive environment formed by the simulation solution 230. As seen in the diagrams, in each initial instance that the anode coupon S was exposed to the surrounding corrosive environment, the corrosion rate spiked dramatically and then dropped off at varying rates, depending on whether the anodic surface area (A) of the anode coupon was 0.04 $cm^2$ (A1), 7.5 $cm^2$ (A2), or 16.6 $cm^2$ (A3).

The determined galvanic current density and corrosion rate can then be referenced to select an effective corrosion inhibitor or film formation that can mitigate damaged films in the field (Step 670). In this regard, historical data in the database 470 (shown in FIG. 7) can be referenced to select the corrosion inhibitor or film formation properties. For instance, the database 470 can include historical data that comprises matrices of various corrosion inhibitors or film formation properties that were previously simulated and assessed and the various types of materials that were tested.

After selecting the corrosion inhibitor or film formation, the selection can be applied to related pipes in the field to remediate pitting corrosion or UDC corrosion (Step 675).

The terms "a," "an," and "the," as used in this disclosure, means "one or more," unless expressly specified otherwise.

The term "backbone," as used in this disclosure, means a transmission medium that interconnects one or more computing resources to provide a path that conveys data signals and instruction signals between the one or more computing resources. The backbone can include a bus or a network. The backbone can include an ethernet TCP/IP. The backbone can include a distributed backbone, a collapsed backbone, a parallel backbone or a serial backbone. The backbone can include any of several types of bus structures that can further interconnect to a memory bus (with or without a memory controller), a peripheral bus, and a local bus using any of a variety of commercially available bus architectures.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "mock-situ," as used in this disclosure means, but is not limited to, simulating or modeling real-world field conditions at a non-field location such as, for example, a laboratory, a refining site, a processing plant, or any other geographic location. The term mock-situ can include a field location.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The terms "transmission," "transmit," "communication," "communicate," "connection," or "connect," as used in this disclosure, include the conveyance of data, data packets, computer instructions, or any other digital or analog information via electricity, acoustic waves, light waves or other electromagnetic emissions, such as those generated with communications in the radio frequency (RF), or infrared (IR) spectra. Transmission media for such transmissions can include subatomic particles, atomic particles, molecules (in gas, liquid, or solid form), space, or physical articles such as, for example, coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical. In certain non-limiting embodiments, one or more process steps, method steps, or algorithms can be omitted or skipped.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. An apparatus suitable for simulating and assessing a damaged corrosion film in a pipe segment for pitting corrosion potential under field conditions, including variations in cathode to anode surface area ratios, the apparatus comprising:
   an anode case that holds a working electrode including a case cover and a case base;
   a first body portion attachable to one end of the pipe segment;
   a second body portion attachable to another end of the pipe segment, the first and second body portions defining a corrosion simulation cell; and
   a case cover driver attached to the case cover and adapted to move the case cover with respect to the case base, wherein the anode case is contained within the corrosion simulation cell, and
   wherein the working electrode includes a test matrix.

2. An apparatus suitable for simulating and assessing a damaged corrosion film in a pipe segment for pitting corrosion potential under field conditions, including variations in cathode to anode surface area ratios, the apparatus comprising: wherein
   an anode case that holds a working electrode including a case cover and a case base;
   a first body portion attachable to one end of the pipe segment; and
   a second body portion attachable to another end of the pipe segment, the first and second body portions defining a corrosion simulation cell,
   wherein the anode case is contained within the corrosion simulation cell, the working electrode includes a test matrix, and
   wherein the case cover comprises an inner wall having an inner thread, and the case base comprises an outer wall having an outer thread that engages said inner thread to attach the case cover to the case base.

3. A method for simulating and assessing a damaged corrosion film in a pipe segment for pitting corrosion potential under field conditions, including variations in cathode to anode surface area ratios, the method comprising:
   positioning the pipe segment between a first body portion and a second body portion;
   positioning an anode case in the pipe segment between the first body portion and second body portion;
   attaching the first body portion to the second body portion to form a simulation cell with the pipe segment, including the anode case; and
   supplying a simulation solution to the simulation cell to pre-expose a cathode area in the pipe segment.

4. The method in claim 3, further comprising:
   opening the anode case to expose a working electrode to the simulation solution.

5. The method in claim 4, wherein opening the anode case comprises unscrewing a case cover from a case base to allow the simulation solution to contact the working electrode.

6. The method in claim 3, further comprising:
   applying a non-conductive protective film to an exposure-control area in the pipe segment.

7. The method in claim 6, wherein the exposure-control area controls a cathode to anode surface area ratio.

8. The method in claim 6, wherein the exposure-control area defines the cathode area in the pipe segment.

9. The method in claim 4, wherein the working electrode comprises an anode coupon.

* * * * *